United States Patent
Koyama et al.

(10) Patent No.: US 9,714,631 B2
(45) Date of Patent: Jul. 25, 2017

(54) AIR INTAKE STRUCTURE OF STRADDLE TYPE VEHICLE

(71) Applicant: HONDA MOTOR CO., LTD., Tokyo (JP)

(72) Inventors: Shinya Koyama, Wako (JP); Satoru Yamasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/966,116

(22) Filed: Dec. 11, 2015

(65) Prior Publication Data

US 2017/0167453 A1 Jun. 15, 2017

(51) Int. Cl.
| | |
|---|---|
| *B60K 13/02* | (2006.01) |
| *F02M 35/16* | (2006.01) |
| *B01D 46/00* | (2006.01) |
| *F02M 35/02* | (2006.01) |
| *F02M 35/04* | (2006.01) |
| *F02M 35/10* | (2006.01) |

(52) U.S. Cl.
CPC ....... *F02M 35/162* (2013.01); *B01D 46/0005* (2013.01); *B60K 13/02* (2013.01); *F02M 35/0201* (2013.01); *F02M 35/048* (2013.01); *F02M 35/10006* (2013.01); *B01D 2279/60* (2013.01)

(58) Field of Classification Search
CPC ........... F02M 35/162; F02M 35/10006; F02M 35/0201; F02M 35/048; B01D 2279/60; B60K 13/02
See application file for complete search history.

(56) References Cited

U.S. PATENT DOCUMENTS

| | | | | | |
|---|---|---|---|---|---|
| 4,482,024 | A | * | 11/1984 | Matsuda | F02B 27/00 123/559.1 |
| 5,560,446 | A | * | 10/1996 | Onishi | B62M 7/02 180/219 |
| 2004/0187828 | A1 | * | 9/2004 | Yasuda | F02M 35/10019 123/184.57 |
| 2009/0218152 | A1 | * | 9/2009 | Oohashi | B60K 13/02 180/68.3 |

(Continued)

FOREIGN PATENT DOCUMENTS

JP 2009-083810 A 4/2009

*Primary Examiner* — Frank Vanaman
(74) *Attorney, Agent, or Firm* — Birch, Stewart, Kolasch & Birch, LLP (57) ABSTRACT

An air cleaner is arranged below a fuel tank of a straddle type disposed above left and right main frames. The air cleaner includes a main chamber which is located between the main frames, and a sub-chamber which is located on the outside in the vehicle width direction of the main frames. A rear section of the sub-chamber and a rear section of the element within the sub-chamber are located in a space formed between each outside wall surface of the main frames and an inside wall surface of the fuel tank. A front section of the sub-chamber and a front section of the element project forwardly of the fuel tank in a side view of the vehicle. The front section of the sub-chamber is provided with the fastening means for fastening the side cover (the element lid) which covers the element from the outside in the vehicle width direction.

15 Claims, 6 Drawing Sheets

(56) References Cited

U.S. PATENT DOCUMENTS

| | | | |
|---|---|---|---|
| 2013/0192912 A1* | 8/2013 | Shimomura | F02M 35/02416 180/68.3 |
| 2014/0209060 A1* | 7/2014 | Ozaki | F02M 35/162 123/319 |

* cited by examiner

AIR INTAKE STRUCTURE OF STRADDLE TYPE VEHICLE

BACKGROUND OF THE INVENTION

1. Field of the Invention

The present invention relates to an air intake structure of a straddle type vehicle in which an air cleaner is arranged below a tank member disposed above a pair of left and right main frames.

2. Description of Background Art

In a straddle type vehicle, such as two-wheeled motorcycle and the like, an air cleaner is known wherein the air cleaner is arranged below a fuel tank which is disposed above a pair of left and right main frames. In this type of vehicle, at least a portion of the air cleaner is located between the left and right frames, and an element is arranged in the upward and downward direction in such a way so as to partition an interior of the air cleaner. See, for example, Japanese Patent Application Laid-Open Publication No. 2009-83810.

In the conventional construction, however, in order for having access to the element it is necessary to remove the fuel tank, whereby operations such as replacement of the element and the like become complicated. Moreover, in the conventional device, the fuel tank is required to be easily attached and removed.

SUMMARY AND OBJECTS OF THE INVENTION

The present invention has been made in view of the above described circumstances. According to an object of an embodiment of the present invention, an air intake structure of a motorcycle is provided that is capable of carrying out maintenance of the element without removing the tank member such as the fuel tank and the like while maintaining the capacity of the air cleaner.

According to an embodiment of the present invention, there is provided an air intake structure of a straddle type vehicle comprising an air cleaner (41) being arranged below a tank member (21) disposed above left and right main frames (13), the tank member (21) being formed of a straddle type covering from an upper side to each lateral side of the left and right main frames (13), the air cleaner (41) including a main chamber (101) which is located between the main frames (13), and a sub-chamber (102) which is located on an outside in a vehicle width direction of the main frames (13), an element (44) being arranged in the sub-chamber (102), and an element lid (43) covering the element (44) from the outside in the vehicle width direction and being fastened to the sub-chamber (102), wherein a rear section (102R) of the sub-chamber (102) and a rear section of the element (44) are located in a space (S1) formed between each outside wall surface (13M) of the main frames (13) and an inside wall surface (21M) of the tank member (21), and wherein a front section (102F) of the sub-chamber (102) and a front section of the element (44) are located forwardly of the space (S1) and project forwardly of the tank member (21) in a side view of a vehicle body, and the front section (102F) of the sub-chamber (102) is provided with the fastening means (73) for fastening the element lid (43).

According to an embodiment of the present invention, the capacity of the main chamber can be ensured by making use of the space between the main frames, and the capacity of the sub-chamber also can be ensured by making use of the space formed between each of the outside wall surfaces of the main frames and the inside wall surface of the fuel tank. In addition, since the fastening means for fastening the element lid which covers the element from the outside in the vehicle width direction is located forwardly of the tank member in the side view of the vehicle, the element lid can be removed without removing the tank member. Therefore, the maintenance of the element can be carried out without removing the tank member while ensuring the capacity of the air cleaner.

According to an embodiment of the present invention, the element lid (43) may have a rearwardly projecting claw portion (43T), and the sub-chamber (102) may be provided, at the rear section (102R) thereof located in the space (S1), with an aperture portion (42H) into which a claw portion (43T) is inserted and engaged from a front side. Thus, it is easy to ensure the supporting rigidity of the element lid, and the element lid can be easily attached and removed in such a way as to be slid in the forward and rearward direction.

According to an embodiment of the present invention, there is provided an element fastening portion (71) for fastening the element (44) to the sub-chamber (102), wherein the element fastening means (71) may be located forwardly of the tank member (21). With this construction, it is possible to have access to the element fastening means without removing the tank member, whereby the replacement of the element can be easily carried out.

According to an embodiment of the present invention, the space (S1) provided between each outside wall surface (13M) of the main frames (13) and the inside wall surface (21M) of the tank member (21) may be formed of a V-shaped space which is widened in the forward direction, the element lid (43) may be formed to be widened in the vehicle width direction while extending forwardly along the inside wall surface (21M) of the tank member (21), and an air intake duct (81) may be removably mounted in a forward position of the tank member (21). With this construction, the sub-chamber can be formed by making use of the space between each of the main frames and the tank member. In addition, the element lid can be easily attached and removed along the inside wall surface of the fuel tank, and the air intake duct can be attached and removed without removing the fuel tank.

According to an embodiment of the present invention, there is provided a resonator (62) which is located downstream of the element (44) in the sub-chamber (102), wherein the resonator (62) may be mounted in an element opening (46A) to which the element (44) is fitted, in the side view of the vehicle body. With this construction, when the element is removed, it is possible to have access to the resonator without removing the fuel tank, whereby the maintenance operations of the resonator can be easily carried out.

According to an embodiment of the present invention, the air cleaner (41) is formed with the main chamber (101) and an air cleaner case (42) having left and right straddling sections (42X) each of which extends left and right from the main chamber (101) and straddles the left and right main frames (13) from above, wherein the left and right straddling sections (42X) may have openings (42K) which open outwardly in the vehicle width direction, and wherein the element (44) may be arranged in each of the openings (42K), and the element lids (43) may be fastened in such a way so as to close each of the openings (42K) to form the pair of left and right sub-chambers (102). With this construction, the left and right sub-chambers can be easily formed by fastening the element lids directly to the air cleaner case. In addition, the main chamber and the sub-chamber are not required to be formed by separate casings, whereby the component parts can be easily reduced.

According to an embodiment of the present invention, the tank member is formed of a straddle type covering from the upper side to each of the lateral sides of the left and right main frames. The air cleaner arranged below the tank member includes the main chamber which is located between the main frames and a sub-chamber (102) which is located on the outside of the main frames in a vehicle width direction. The rear section of the sub-chamber and the rear section of the element are located in the space formed between each outside wall surface of the main frames and the inside wall surface of the fuel tank. The front section of the sub-chamber and the front section of the element are located forwardly of the space and project forwardly of the tank member in the side view of the vehicle. The front section of the sub-chamber is provided with the fastening means for fastening the element lid which covers the element from the outside in the vehicle width direction. Therefore, the maintenance of the element can be carried out without removing the tank member while ensuring the capacity of the air cleaner.

According to an embodiment of the present invention, the element lid has the rearwardly projecting claw portion and the sub-chamber is provided, at the rear section thereof located in the space, with the aperture portion into which a claw portion is inserted and engaged from the front side, it is easy to ensure the supporting rigidity of the element lid, and the element lid can be easily attached and removed in such a way so as to slid in the forward and rearward direction.

According to an embodiment of the present invention, the element fastening means is provided for fastening the element to the sub-chamber. Since the element fastening means is located forwardly of the tank member, it is possible to have access to the element fastening portion without removing the tank member whereby the replacement of the element can be easily carried out.

According to an embodiment of the present invention, the space provided between each outside wall surface of the main frames and the inside wall surface of the tank member is formed of a V-shaped space which is widened in the forward direction. The element lid is formed to be widened in the vehicle width direction while extending in the forward direction along the inside wall surface of the tank member. The air intake duct is removably mounted in the forward position of the tank member. Therefore, the sub-chamber can be formed by making use of the space between each of the main frames and the tank member. Moreover, the element lid can be easily attached and removed along the inside wall surface of the fuel tank, and the air intake duct can be attached and removed without removing the fuel tank.

According to an embodiment of the present invention, the resonator is located downstream of the element in the sub-chamber. In the side view of the vehicle body, the resonator is mounted in the element opening to which the element is fitted. Therefore, when the element is removed, it is possible to have access to the resonator without removing the fuel tank, whereby the maintenance operations of the resonator can be easily carried out.

According to an embodiment of the present invention, the air cleaner is configured to form the main chamber and the air cleaner case having the left and right straddling sections each of which extends left and right from the main chamber and straddles the left and right main frames from above. The left and right straddling sections have the openings which open outwardly in the vehicle width direction. The element is arranged in each of the openings, and the element lid is fastened in such a way as to close each of the openings to form the pair of left and right sub-chambers. Therefore, the left and right sub-chambers can be easily formed and the component parts can be easily reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiment of the present invention will be described hereunder with reference to accompanying drawings. In the following description, the orientation such as front, rear, left, right, upper and lower shall be identical to the orientation of a vehicle body unless otherwise described. In addition, in each drawing, a reference character FR designates a forward direction of the vehicle body, a reference character UP designates an upper direction of the vehicle body and a reference character LE designates a left direction of the vehicle body.

Figure 1:
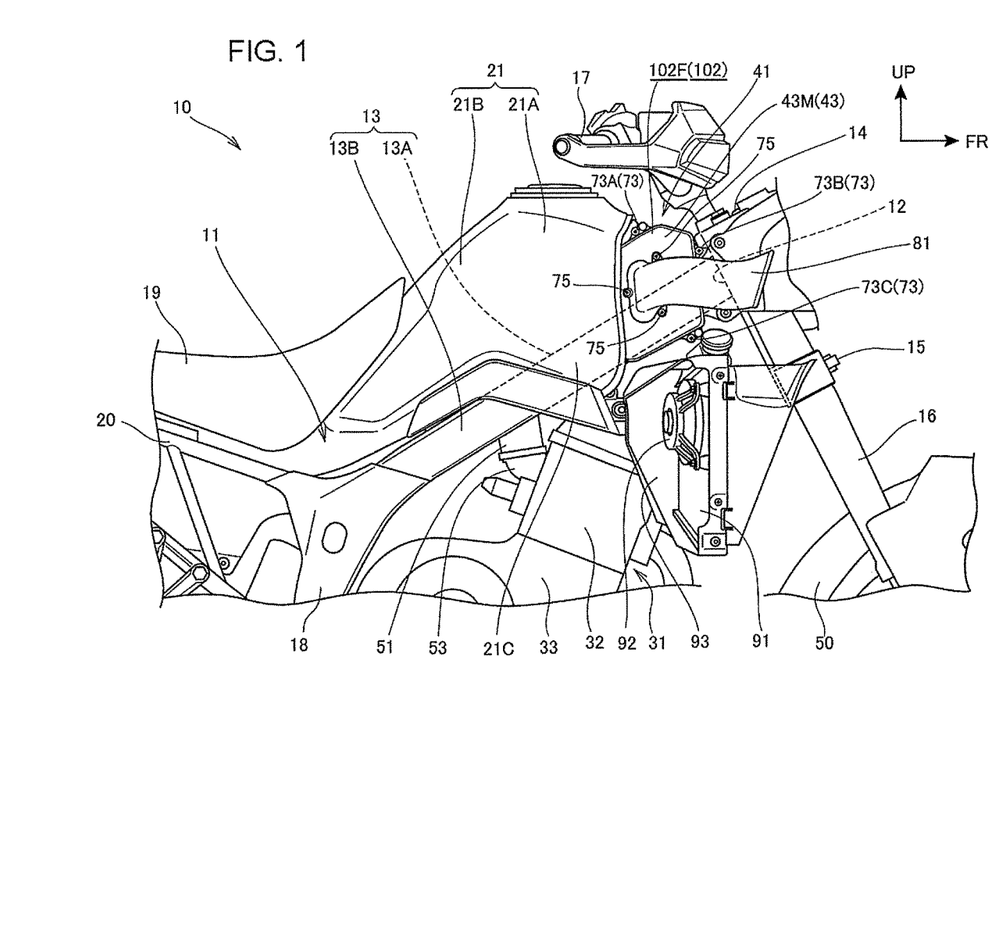
FIG. 1 is a right side view of a front part of a two-wheeled motorcycle in accordance to an embodiment of the present invention.

FIG. 1 is a right side view of a front part of a two-wheeled motorcycle in accordance with an embodiment of the present invention.

A vehicle body frame 11 of this motorcycle 10 includes a pair of left and right main frames 13 that extends rearwardly and downwardly from a head pipe 12. A fuel tank (tank member) 21 is located above the main frames 13 with an engine 31 being supported below the main frames 13.

A pair of left and right front forks 16 is supported through a pair of upper and lower bridge members (a top bridge and a bottom bridge) 14, 15 by the head pipe 12 in a leftward and rightward rotatable fashion. A handle 17 also is supported by the head pipe 12. When the handle 17 is operated left and right, a front wheel 50 which is carried between lower ends of the left and right front forks 16 is steered left and right.

A pair of left and right pivot plates 18 is joined to each rear end portion of the left and right main frames 13. On the pivot plates 18 there is attached a pair of left and right steps (not shown in the drawing) for allowing feet of a driver sitting on a rider's seat 19 located in the rear of the fuel tank 21, to be rested thereon.

To the pivot plates 18 there is joined a pair of left and right seat frames 20 which extends upwardly to the rear in the rearward direction of the vehicle body. The rider's seat 19 is supported by the seat frames 20.

Figure 2:
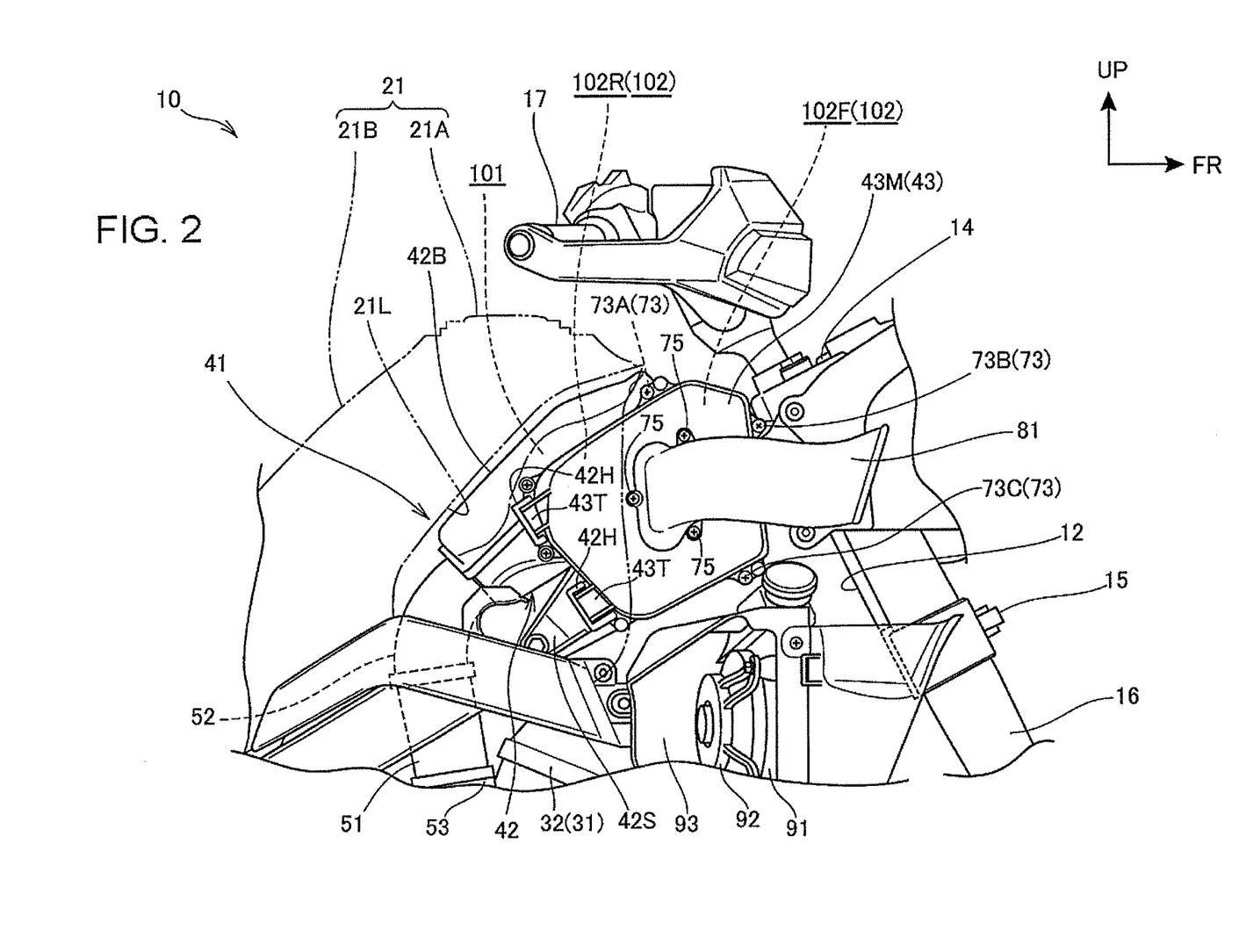
FIG. 2 is a side view in which a fuel tank of FIG. 1 is shown by dash-double dot lines.
Figure 3:
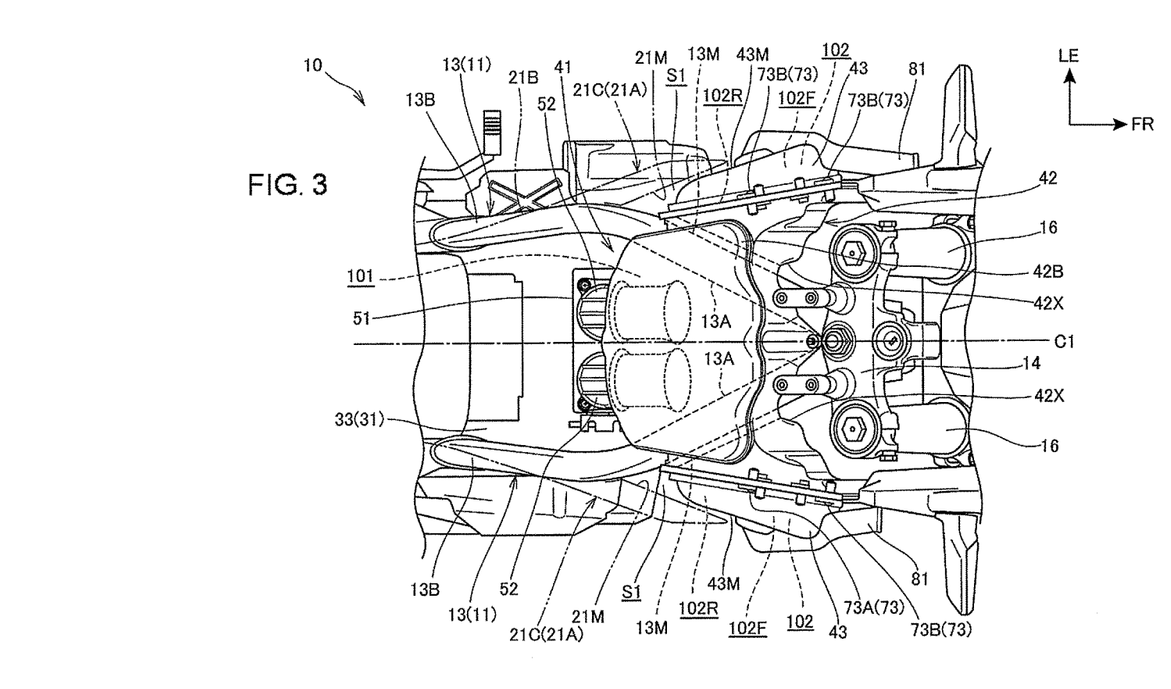
FIG. 3 is a top plan view of FIG. 2 as seen from an upward position of the vehicle body.

FIG. 2 is a side view in which a fuel tank of FIG. 1 is indicated by dash-double dot lines. FIG. 3 is a top plan view of FIG. 2 as seen from an upward position of the vehicle body.

As shown in FIGS. 2 and 3, in a plan view of the vehicle body (FIG. 3), the left and right main frames 13 are integrally provided with main frame front sections 13A which extend from the head pipe 12 to the rear and outwardly in the vehicle width direction and main frame rear sections 13B which extend from rear end portions of the main frame front sections 13A to the rear and inwardly in the vehicle width direction.

An air cleaner 41 is arranged on the left and right main frame front sections 13A. The fuel tank 21 is formed into a straddle type tank which straddles the main frame front sections 13A and the main frame rear sections 13B from above. The fuel tank 21 is configured to cover the air cleaner 41 from above. More specifically, the air cleaner 41 is arranged by making use of a space between the fuel tank 21 and the engine 31.

A throttle body 51 (FIGS. 2 and 3) is arranged between the air cleaner 41 and the engine 31. As shown in FIG. 2, an upper end portion of the throttle body 51 is connected through a connecting tube 52 to a rear lower part of the air cleaner 41, while a lower end portion of the throttle body 51 is connected through an insulator 53 to a cylinder section 32 of the engine 31. With this construction, an air intake course from the air cleaner 41 to the engine 31 can be formed in the shape of a downwardly linearly extending passage whereby to contribute to an improvement in the air intake efficiency of the engine 31.

The engine 31 is formed in a parallel multiple cylinder engine (a two cylinder engine in this construction) of the type in which the cylinder section 32 to which the throttle body 51 is connected extends upwardly from a front upper part of a crank case 33.

As shown in FIGS. 1 and 2, the fuel tank 21 is integrally provided broadly with a tank front section 21A which extends to cover from upper sides to left and right lateral sides of the main frame front sections 13A and a tank rear section 21B which is located above the main frame rear sections 13B. The tank front section 21A has a pair of left and right outside covering sections 21C for covering each outside of the left and right main frame front sections 13A. A visible outline of this outside covering section 21C is indicated by the dash-double dot lines in FIG. 3.

With this tank arrangement construction, as shown in FIG. 3, a pair of V-shaped spaces S1 which is widened in the vehicle width direction while extending in the forward direction is formed between an inside wall surface 21M (corresponding to the inside wall surface of the tank front section 21A) of the outside covering section 21C and an outside wall surface 13M of the main frame front section 13A.

Since the tank front section 21A extends to cover from the upper side to the left and right sides of the main frame front sections 13a, the capacity of the fuel tank can be increased. On the other hand, the tank rear section 21B is formed within the width between the main frame rear sections 13B in the plan view of the vehicle body. Therefore, the driver sitting on the rider's seat 19 can easily straddle the fuel tank 21, and it is possible to improve the degrees of freedom with respect to the movement of the driver.

The air cleaner 41, in the plan view of the vehicle body, includes an air cleaner case 42 which is formed with a main chamber 101 between the left and right main frame front sections 13a, and a pair of left and right side covers (element lids) 43 which is connected to each of left and right front portions of the air cleaner case 42 and formed with a sub-chamber 102 inside thereof.

The main chamber 101 is a space which is connected through the connecting tubes 52 (multiple (two) connecting tubes in this construction) provided for each of cylinders, to the throttle body 51 located on the side of the engine 31. The main chamber 101 is configured to store clean air that is just about to be inhaled into the engine 31. In addition, the sub-chamber 102 is a space for accommodating therein an element 44 which purifies outside air. The outside air introduced into the sub-chamber 102 is purified by the element 44 and supplied to the main chamber 101.

Figure 4:
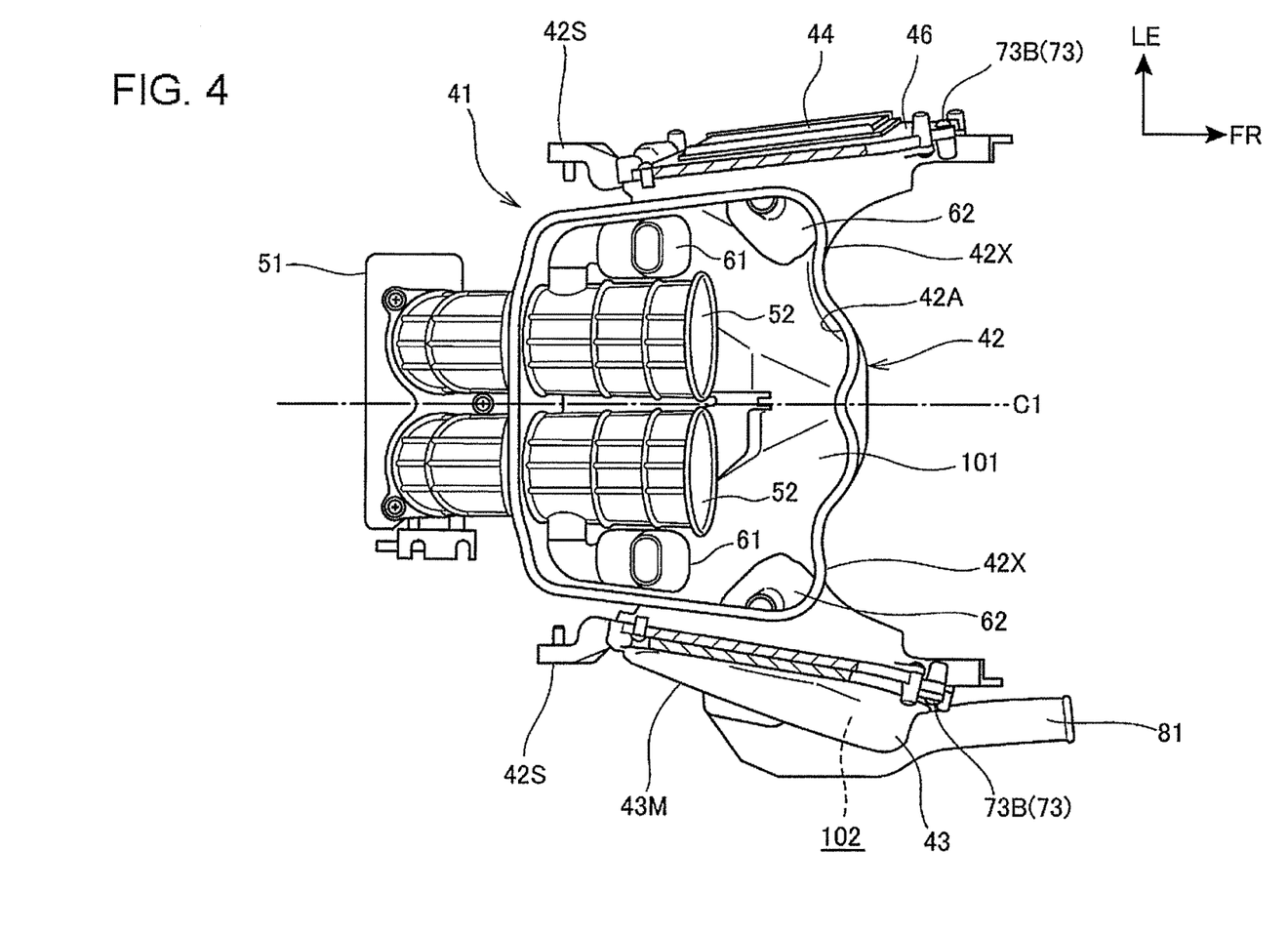
FIG. 4 is a top plan view showing an internal structure of an air cleaner as seen from above.
Figure 5:
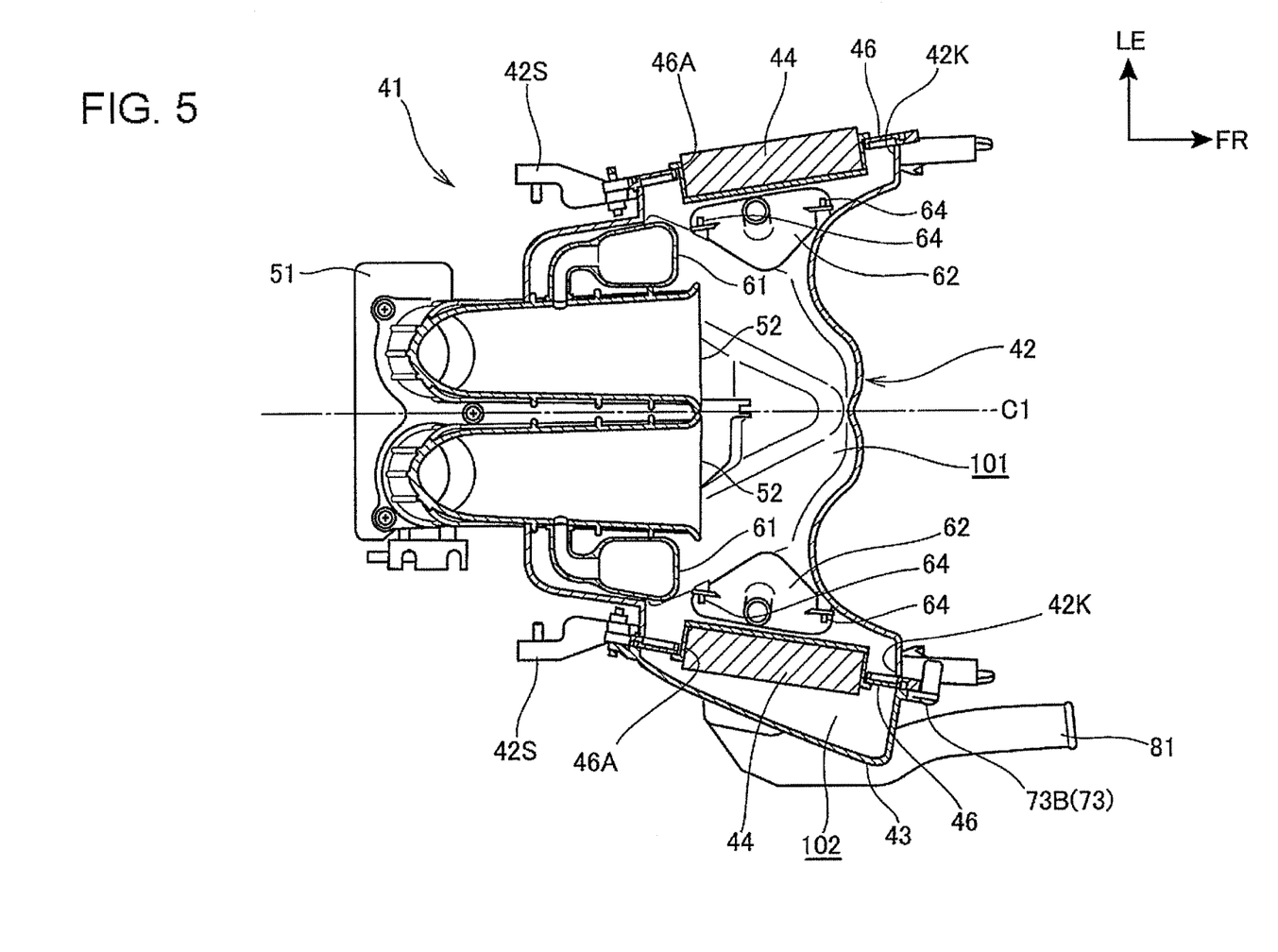
FIG. 5 is a cross sectional view of the air cleaner of FIG. 4.

FIG. 4 is a top plan view showing an internal structure of the air cleaner 41 as seen from above and FIG. 5 is a cross sectional view of the air cleaner 41 of FIG. 4. In FIG. 4, the right side cover 43 is attached and the left side cover 43 is removed.

As shown in FIGS. 2 through 5, the air cleaner case 42 is formed in a hollow structure which has an opening (hereinafter, referred to as the upper opening) 42A which opens upwardly between the left and right main frame front sections 13A. This upper opening 42A is closed with a cover body 42B (FIG. 3) thereby to form the main chamber 101.

The air cleaner case 42, as shown in FIG. 4, includes left and right straddling sections 42X each of which extends left and right from the main chamber 101 and straddles the left and right main frame front sections 13A from above. The straddling sections 42X each have openings (hereinafter, referred to as the lateral openings) 42K which open outwardly in the vehicle width direction (see FIG. 5). Moreover, each of the straddling sections 42X has a stay 42S which extends rearwardly from the lateral opening 42K and is fastened to each of the main frames 13. The air cleaner 41 is supported on the main frames 13 by the pair of left and right stays 42S.

As shown in FIGS. 4 and 5, the element 44 is arranged in each of the lateral openings 42K and the side cover 43 is fastened in such a way so as to close each of the lateral openings 42K whereby to form the pair of left and right sub-chambers 102.

By the way, the air cleaner case 42 is of bilaterally symmetrical configuration with respect to a center plane C1 (hereinafter, referred to as the vehicle body center plane) in the vehicle width direction (see FIG. 3). Similarly, the side covers 43 each are of bilaterally symmetrical configuration with respect to the vehicle body center plane C1.

The main chamber 101, as shown in FIG. 3, is formed in a rectangular box shape which extends over the left and right main frame front sections 13A in the vehicle width direction. Moreover, an upper surface (corresponding to an upper surface of the cover body 42B) of the main chamber 101, as shown in FIG. 2, is formed along a bottom plate 21L of the fuel tank 21 in the side view of the vehicle body. With this construction, the main chamber 101 is able to be arranged in the vicinity of the bottom plate 21L of the fuel tank 21, and by making efficient use of an open space between the fuel tank and the engine 31, it is possible to form the large capacity main chamber 101. In addition, since the elements 44 are not arranged between the left and right main frames 13, the capacity of the main chamber 101 can also be increased for this reason. Further, since the main chamber 101 is covered with the fuel tank 21, the main chamber 101 is not visible from outside whereby to contribute to an improvement in the vehicle body design.

As shown in FIGS. 4 and 5, in the main chamber 10a first resonators 61 which extend from the left and right connecting tubes 52 and second resonators 62 are provided which are arranged between the main chamber 101 and each of the left and right sub-chambers 102. The first resonators 61 are resonators for decreasing air intake noises of the left and right connecting tubes 52 by making use of a theory of a Helmholtz resonator and are arranged in pairs to the left and to the right between each of the connecting tubes 52 and each of left and right lateral walls of the main chamber 101.

Moreover, the second resonators 62 are resonators for decreasing air intake noises of the left and right sub-chambers 102 by making use of the theory of the Helmholtz resonator and are arranged each on downstream sides of the elements 44 of the left and right sub-chambers 102. The left and right first resonators 61 and the left and right second resonators 62 are located in bilaterally symmetrical positions with respect to the vehicle body center plane C1.

Each of the left and right resonators 61 are connected to the connecting tubes 52, and each of the left and right second resonators 62 are removably attached to the air cleaner case 42 by means of a pair of forwardly and rearwardly engaging portions 64 (see FIG. 5).

As shown in FIG. 5, each of the elements 44 is mounted on a partition wall 46 for covering the lateral opening 42K of the air cleaner case 42. The partition wall 46 is fastened to the lateral opening 42K of the air cleaner case 42 and configured to partition the sub chamber 102 into left and right rooms.

Figure 6:
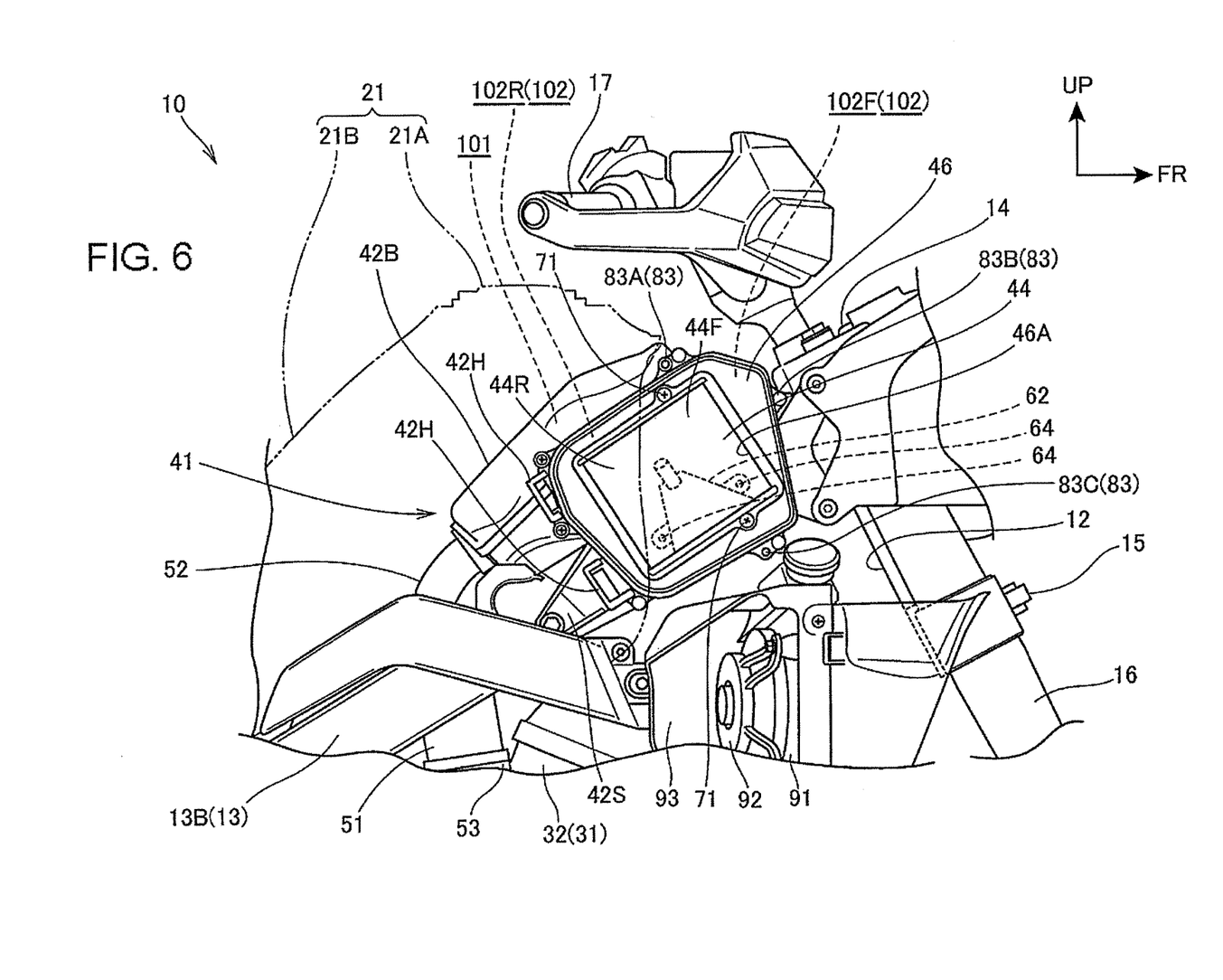
FIG. 6 is a right side view showing the air cleaner and its surrounding structure.

FIG. 6 is a right side view showing the air cleaner 41 and its surrounding structure. In FIG. 6, the side cover 43 is removed and the partition wall 46 is exposed outwardly.

The partition wall 46 has an element opening 46A to which the element 44 is attached. The element 44 is fastened to the partition wall 46 by a pair of upper and lower fastening means 71 (male screws in this construction).

As shown in FIG. 6, the left and right resonators 62, in the side view of the vehicle body, are mounted in the element openings 46A, respectively. Accordingly, in the case where each of the side cover 43 and the elements 44 is dismounted, the second resonator 62 is exposed outwardly whereby the maintenance and the attaching and removing operations are able to be easily carried out.

As shown in FIG. 3, each of the sub-chambers 102 is formed in a box shape which extends along the V-shaped space S1 formed between each outside wall surface 13M of the main frames (13) and the inside wall surface 21M of the fuel tank 21. Moreover, the sub-chambers 102, in the side view of the vehicle body, are arranged in such positions as to overlap with the left and right mainframes 13 and the fuel tank 21.

Hereinafter, the sub-chambers 102 will be explained in detail. A rear section 102R of the sub-chamber 102 extends in the upward and downward direction and is fitted into the V-shaped space S1. As shown in FIG. 2, the rear section 102R overlaps with the outside covering section 21C of the fuel tank 21 in the side view of the vehicle body. On the other hand, a front section 102F of the sub-chamber 102 is located forwardly of the space S1 and projects forwardly of the outside covering section 21C of the fuel tank 21 in the side view of the vehicle body.

As shown in FIG. 2, the rear section 102R of the sub-chamber 102 includes at least a rear end portion of the sub-chamber 102, and includes both of a rear end portion of the lateral opening 42K and a rear end portion of the side cover 43. Similarly, the front section 102F of the sub-chamber 102 includes at least a front end portion of the sub-chamber 102 (a front end portion of the lateral opening 42K, and a front end portion of the side cover 43). In this construction, the front section 102F includes also an intermediate portion in the forward and rearward direction of the sub-chamber 102 (an intermediate portion in the forward and rearward direction of the lateral opening 42K, and an intermediate portion in the forward and rearward direction of the side cover 43) in addition to the front end portion of the sub-chamber 102.

The side cover 43 which constitutes an outside portion in the vehicle width direction of the sub-chamber 102 is formed in the shape of a cover which is widened in the vehicle width direction while extending in the forward direction, whereby the whole sub-chamber 102 is formed in a swelled shape which is widened in the vehicle width direction while extending in the forward direction.

An outer lateral surface 43M of the side cover 43 which constitutes an outer surface in the vehicle width direction of the sub-chamber 102 is formed as an inclined surface extending along the insider wall surface 21M of the fuel tank 21 in the condition where the side cover 43 is attached to the air cleaner case 42. In addition, each of inside surfaces 42M of the straddling sections 42X, which constitutes an inside surface in the vehicle width direction of the sub-chamber 102 in the position opposed to the main frame front section 13A, is formed as an inclined surface extending along the outside wall surface 13M (as shown in FIG. 3) of the main frame front section 13A. With this construction, the sub-chambers 102 can be arranged in the vicinity of the inside wall surface 21M of the fuel tank 21 and the outside wall surfaces 13M of the main frame front sections 13A while increasing the capacity thereof by making use of the space S1.

A large capacity main chamber 101, and the sub-chambers 102 are provided with an increase in capacity, whereby it is possible to provide the air cleaner 41 which has the large capacity and broad element area and which is easy to improve the air intake efficiency.

When the outer lateral surface 43M of the side cover 43 is slid forwardly and rearwardly along the inside wall surface 21M of the fuel tank 21, the side cover 43 is easily put into and taken out of the V-shaped space S. More specifically, the side cover 43 is able to be easily put in and taken out by employing the inside wall surface 21M of the fuel tank 43 as a guide.

As shown in FIG. 2, a pair of upper and lower rearwardly projecting claw portions 43T is integrally provided on each of rear sections 102R of the side covers 43. Similarly, around the lateral opening 42K of the straddling section 43 into which the side cover 43 is fitted, there is integrally provided a pair of upper and lower aperture portions 42H into which the pair of upper and lower claw portions 43T is inserted from the forward direction so as to be engaged therewith.

With this construction, when the side cover 43 is slid rearwardly by employing the inside wall surface 21M of the fuel tank 21 as a guide, the claw portions 43T of the side cover 43 are able to be easily engaged with the aperture portions 42H of the straddling section 42X. Due to the engagement, the side cover 43 is allowed to be temporarily assembled.

As shown in FIG. 6, the engagement structure between a claw portions 43T and the aperture portions 42H is provided on the rear sections of the sub-chambers 42, and is covered with the fuel tank 21. Therefore, the engagement structure is not exposed outwardly whereby to contribute to the improvement in the vehicle body design.

Since the side cover 43 is allowed to be temporarily assembled, the operation for fastening the side cover 43 by a plurality of fastening means 73A, 73B, 73C is easily carried out.

These fastening means 73A, 73B, 73C for fixing the side cover 43 are fastened through the side cover 43 to the partition wall 46.

More specifically, as shown in FIG. 6, on the partition wall 46 there are integrally formed a plurality of fastened portions 83A, 83B, 83C to be fastened by the fastening means 73A, 73B, 73C. These fastened portions 83A, 83B, 83C are formed in the shape of a female screw and provided at spaced intervals in the partition wall 46 in an area of the front section 102F of the sub-chamber 102 and around the lateral opening 42K.

As shown in FIG. 2, the fastening means 73A is a male screw for fastening from the outside in the vehicle width direction a front upper portion of the side cover 43 to the fastened portion 83A provided on the side of the air cleaner case 42. In addition, the fastening means 73B is a male screw for fastening from the outside in the vehicle width direction the front end portion of the side cover 43 to the fastened portion 83B provided on the side of the air cleaner case 42. Moreover, the fastening means 73C is a male screw for fastening from the outside in the vehicle width direction a lower end portion of the side cover 43 to the fastened portion 83C provided on the side of the air cleaner case 42.

The fastening means 73A, 73B, 73C and the fastened portions 83A, 83B, 83C are designated respectively "fastening means 73" and "fastened portions 83" provided that there is no need to make a distinction particularly therebetween.

Referring again to FIG. 2, these fastening means 73 are fastened to the area of the front section 102F of the sub-chamber 102 from the outside in the vehicle width direction, so that the fastening means 73 are able to be attached and removed without removing the fuel tank 21, respectively. Therefore, the side cover 43 is allowed to be easily attached and removed without removing the fuel tank 21.

When the side cover 43 has been removed, as shown in FIG. 6, the element 44 is exposed outwardly. More specifically, the side cover 43 functions as an element lid for covering the element 44 in such a way so as to expose the latter freely and also functions as a cover for defining a space upstream of the element 44 in the sub-chamber 102.

The side cover 43 and an air intake duct 81 to be referred to later are covered with a vehicle body cover (a front side cowling), not shown in the drawing, for covering the left and right of the front part of the vehicle body. The vehicle body cover (the front side cowling) is mounted in a removable fashion without removing the fuel tank 21.

As shown in FIG. 6, a rear section 44R of the element 44 overlaps with the outside covering section 21C of the fuel tank 21 in the side view of the vehicle body, while a front section 44F of the element 44 is exposed forwardly of the outside covering section 21C of the fuel tank 21 in the side view of the vehicle body. With this configuration, the element 44 of a large size is able to be arranged.

The upper and lower fastening portions 71 for fastening the element 44, as shown in FIG. 6, are fixed on the partition wall 46 in the area of the front section 102F of the sub-chamber 102 from the outside in the vehicle width direction. Therefore, the fastening portions 71 can be fastened and unfastened without removing the fuel tank 21, whereby the element 44 can be easily attached and removed. Thus, various kinds of maintenance operations such as inspection, cleaning, replacement, etc. with respect to the element 44 can be easily carried out without removing the fuel tank 21.

Further, the air intake ducts 81 for introducing the outside air into the sub-chambers 102 are provided on the left and right side covers 43, respectively. These air intake ducts 81 extend forwardly from the side covers 43, and each of front ends thereof opens forwardly so as to inhale the outside air in front of the engine 31. Therefore, the outside air which is not thermally influenced by the engine 31 can be introduced into the sub-chambers 102.

These air intake ducts 81 are fixed on the left and right side covers 43 in such a way so as to fasten a plurality of fastening means 75 to the outer lateral surfaces 43M of the side covers 43 respectively from the outside in the vehicle width direction. These fastening means 75 are fastened to the outer lateral surfaces 43M of the side covers 43 located in the area of the front sections 102F of the sub-chambers 102. Therefore, the plurality of fastening means 75 can be fastened and unfastened without removing the fuel tank 21, and the air intake ducts 81 can be easily attached and removed.

As shown in FIG. 2, since the air intake duct 81 is fastened to an intermediate portion (corresponding to an intermediate portion in the forward and rearward direction of the sub-chamber 102) in the forward and rearward direction of the outer lateral surface 43M of the side cover 43, the outside air is allowed to flow toward a center of the element 44.

Further, in this motorcycle 10, as shown in FIG. 1, a pair of left and right radiators 91 for air-cooling cooling water which has passed through the engine 31 is arranged below the left and right side covers 43 and on the left and right sides of the cylinder sections 32 of the engine 31. As described above, since the air intake ducts 81 extend forwardly from the left and right side covers 43, the outside air heated by the radiators 83 is hard to enter the air intake ducts 81. Therefore, the outside air which is not thermally influenced by the radiators 83 can be introduced into the sub-chambers 102.

A radiator fan 92 is attached to a back surface of the radiator 91, and a radiator cover 93 which extends rearwardly at an upper side and an inside in the vehicle width direction of the radiator 83 is attached to the radiator 83. This radiator cover 93 restrains the heat from being transmitted from the engine 31 to the radiator 83, and guides rearwardly the outside air which has passed through the radiator 91. Therefore, the thermal influence upon the air cleaner 41 located above the radiator 91 in the side view of the vehicle body can be restrained.

As described above, in this embodiment, as shown in FIG. 2, the air cleaner 41 is arranged below the fuel tank 21 of a straddle type disposed above the left and right main frames 13. The air cleaner 41 includes the main chamber 101 which is located between the main frames 13, and the sub-chamber 102 which is located on the outside in the vehicle width direction of the main frames 13. The rear section 102R of the sub-chamber 102 and the rear section of the element 44 within the sub-chamber 102 are located in the space S1 formed between each outside wall surface 13M of the main frames 13 and the inside wall surface 21M of the fuel tank 21. The front section 102F of the sub-chamber 102 and the front section of the element 44 are located forwardly of the space S1 and project forwardly of the fuel tank 21 in the side view of the vehicle. The front section 102F of the sub-chamber 102 is provided with the fastening means 73 for fastening the side cover (the element lid) 43 which covers the element 44 from the outside in the vehicle width direction.

The capacity of the main chamber 101 can be ensured by making use of the space between the main frames 13. Thus, the capacity of the sub-chamber 102 also can be ensured by making use of the space S1 formed between each of the outside wall surfaces 13M of the main frames 13 and the inside wall surface 21M of the fuel tank 21. In addition, since the fastening means for fastening the side cover 43 which covers the element 44 from the outside in the vehicle width direction is located forwardly of the fuel tank 21 in the side view of the vehicle, it is possible to have access to the fastening means 73 without removing the fuel tank 21. Therefore, the maintenance such as the inspection, cleaning, replacement, etc. of the element 44 located within the side cover 43 can be carried out without removing the fuel tank while ensuring the capacity of the air cleaner 41.

As shown in FIG. 2, the side cover 43 has the rearwardly projecting claw portion 43T, and the sub-chamber 102 is provided, at the rear section 102R thereof located in the space S1, with the aperture portion 42H into which a claw portion 43T is inserted so as to be engaged therewith from the front side. With this construction, it is easy to ensure the supporting rigidity of the side cover 43. Moreover, the side cover 43 can be temporarily attached to the sub-chamber 102 or removed from the sub-chamber 102 by sliding the side cover 43 in the forward and rearward direction, whereby the attaching and removing operations of the side cover 43 can be easily carried out.

Further, as shown in FIG. 6, since the fastening means (the element fastening means) 71 for fastening the element 44 to the sub-chamber 102 is located forwardly of the fuel tank member 21, it is possible to have access to the fastening means 71 when the side cover 43 is removed. Therefore the element 44 can be removed without removing the fuel tank 21 whereby the replacement of the element 44 or the like can be easily carried out.

Further, as shown in FIG. 3, the space S1 provided between each outside wall surface 13M of the main frames 13 and the inside wall surface 21M of the fuel tank 21 is formed in substantially a V-shaped space which is widened in the forward direction. The side cover 43 is formed to be widened in the vehicle width direction while extending forwardly along the inside wall surface 21M of the fuel tank 21. The air intake duct 81 is removably mounted in the forward position of the fuel tank 21. With this construction, the sub-chamber 102 can be formed by making use of the space S1 between each of the main frames 13 and the fuel tank 21. In addition, the side cover 43 can be easily attached and removed along the inside wall surface 21M of the fuel tank 21, and the air intake duct 81 can be attached and removed without removing the fuel tank 21.

Further, as shown in FIG. 6, the second resonator 62 is located downstream of the element 44 in the sub-chamber 102. The second resonator 62 is mounted in the element opening 46A to which the element 44 is fitted, in the side view of the vehicle. With this construction, when the element 44 is removed, it is possible to have access to the second resonator 62 without removing the fuel tank 21, whereby the maintenance operations, such as the inspection, replacement, etc. of the second resonator 62 can be easily carried out.

Further, as shown in FIG. 5, the air cleaner 41 is formed with the main chamber 101 and the air cleaner case 42 having left and right straddling sections 42X each of which extends left and right from the main chamber 101 and straddles the left and right main frames 13 from above. The left and right straddling sections 42X have openings 42K which open outwardly in the vehicle width direction. The elements 44 are arranged in each of the openings 42K and the side covers 43 are fastened in such a way as to close each of the openings 42K to form the pair of left and right sub-chambers 102.

The left and right sub-chambers 102 can be easily formed by fastening the side covers 43 directly to the air cleaner case 42. In addition, the main chamber 101 and the sub-chamber 102 are not required to be formed by separate casings. Thus, the component parts can be easily reduced.

While the present invention has been described in its preferred embodiment, it is to be understood that the present invention is not limited to the above described embodiment, and that various changes and modifications may be made without departing from the spirit of the present invention.

For example, although, in the above embodiment, the fuel tank 21 is located above the left and right main frames 13 and the air cleaner case 41 is located below the fuel tank 21, the fuel tank may be located in another place and the tank member serving as a container box may be arranged above the left and right main frames 13. More specifically, the air intake structure of the present invention may be applied to the structure in which the tank member such as the fuel tank, the container box or the like is arranged above the left and right main frames 13 and the air cleaner 41 is arranged below the tank member.

Although, in the above embodiment, the fastening means 71, 73 are formed of the male screws and the fastened portions 83 are formed of the female screws, publicly known fastening structures may be broadly employed. For example, a quick fastener may be employed as the fastening means 73.

In the above embodiment, the present invention is directed to the air intake structure of the motorcycle 10, the present invention may be broadly applied to the air intake system of straddle type vehicles inclusive of those other than the two-wheeled motorcycle. The straddle type vehicles include all the vehicles to be straddled at the time of riding, such as the two-wheeled motorcycles (including a motor driven bicycle), three-wheeled vehicles and four-wheeled vehicles classified as an ATV (all terrain vehicle), a three-wheeled motorcycle or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air intake structure of a straddle vehicle in which an air cleaner is arranged below a tank member disposed above left and right main frames, comprising:
   the tank member being formed of a straddle covering from an upper side to each lateral side of the left and right main frames;
   the air cleaner including a main chamber, located between the main frames, and a pair of sub-chambers, each sub-chamber located on an outside in a vehicle width direction of the main frames;
   an element being arranged in each sub-chamber; and
   an element lid covering the element from the outside in the vehicle width direction and being fastened to each sub-chamber, wherein a rear section of the sub-chamber and a rear section of the element are located in a space formed between each outside wall surface of the main frames and an inside wall surface of the tank member, wherein a front section of each sub-chamber and a front section of the element are located in a forward direction of the space and project forwardly of the tank member in a side view of a vehicle body, and the front section of each sub-chamber is provided with a fastener for fastening the element to the lid, and wherein each element lid has a rearwardly projecting claw portion, each sub-chamber being provided, at the rear section thereof located in the space, with an aperture portion into which the claw portion is inserted and engaged from a front side.

2. The air intake structure of the straddle vehicle according to claim 1, and further comprising an element fastener for fastening the element to each sub-chamber, wherein each element fastener is located forwardly of the tank member.

3. The air intake structure of the straddle vehicle according to claim 2, wherein the space provided between each outside wall surface of the main frames and the inside wall surface of the tank member is formed of a substantially V-shaped space which is widened in the forward direction, the element lid is formed to be widened in the vehicle width direction while extending forwardly along the inside wall surface of the tank member, and an air intake duct is removably mounted in a forward position of the tank member.

4. The air intake structure of the straddle vehicle according to claim 2, and further comprising a resonator being located downstream of the element in the sub-chamber, wherein the resonator is mounted in an element opening to which the element is fitted, in the side view of the vehicle body.

5. The air intake structure of the straddle vehicle according to claim 2, wherein the air cleaner is formed with the main chamber and an air cleaner case having left and right straddling sections each of which extends left and right from the main chamber and straddles the left and right main frames from above, wherein the left and right straddling sections have openings which open outwardly in the vehicle width direction, and wherein the element is arranged in each of the openings and the element lid is fastened in such a way so as to close each of the openings to form the pair of sub-chambers.

6. The air intake structure of the straddle vehicle according to claim 1, wherein the space provided between each outside wall surface of the main frames and the inside wall surface of the tank member is formed of a substantially V-shaped space which is widened in the forward direction, the element lid is formed to be widened in the vehicle width direction while extending forwardly along the inside wall surface of the tank member, and an air intake duct is removably mounted in a forward position of the tank member.

7. The air intake structure of the straddle vehicle according to claim 1, and further comprising a resonator being located downstream of the element in the sub-chamber, wherein the resonator is mounted in an element opening to which the element is fitted, in the side view of the vehicle body.

8. An air intake structure of a straddle vehicle in which an air cleaner is arranged below a tank member disposed above left and right main frames, comprising:

the tank member being formed of a straddle covering from an upper side to each lateral side of the left and right main frames;

the air cleaner including a main chamber, located between the main frames, and a pair of sub-chambers, each sub-chamber located on an outside in a vehicle width direction of the main frames;

an element being arranged in each sub-chamber; and an element lid covering the element from the outside in the vehicle width direction and being fastened to each sub-chamber, wherein a rear section of each sub-chamber and a rear section of each element are located in a space formed between each outside wall surface of the main frames and an inside wall surface of the tank member, wherein a front section of each sub-chamber and a front section of each element are located in a forward direction of the space and project forwardly of the tank member in a side view of a vehicle body, and the front section of each sub-chamber is provided with a fastener for fastening the element lid, and wherein the space provided between each outside wall surface of the main frames and the inside wall surface of the tank member is formed of a substantially V-shaped space which is widened in the forward direction, the element lid is formed to be widened in the vehicle width direction while extending forwardly along the inside wall surface of the tank member, and an air intake duct is removably mounted in a forward position of the tank member.

9. The air intake structure of the straddle vehicle according to claim 8, and further comprising a resonator being located downstream of the element in the sub-chamber, wherein the resonator is mounted in an element opening to which the element is fitted, in the side view of the vehicle body.

10. An air intake structure of a straddle vehicle in which an air cleaner is arranged below a tank member disposed above left and right main frames, comprising:

the tank member being formed of a straddle covering from an upper side to each lateral side of the left and right main frames;

the air cleaner including a main chamber, located between the main frames, and a pair of sub-chambers, each sub-chamber located on an outside in a vehicle width direction of the main frames;

an element being arranged in the sub-chamber; and an element lid covering the element from the outside in the vehicle width direction and being fastened to the sub-chamber, wherein a rear section of the sub-chamber and a rear section of the element are located in a space formed between each outside wall surface of the main frames and an inside wall surface of the tank member, wherein a front section of the sub-chamber and a front section of the element are located in a forward direction of the space and project forwardly of the tank member in a side view of a vehicle body, and the front section of the sub-chamber is provided with a fastener for fastening the element lid, and wherein the air cleaner is formed with the main chamber and an air cleaner case having left and right straddling sections each of which extends left and right from the main chamber and straddles the left and right main frames from above, wherein the left and right straddling sections have openings which open outwardly in the vehicle width direction, and wherein the element is arranged in each of the openings and the element lid is fastened in such a way so as to close each of the openings to form the pair of left and right sub-chambers.

11. An air intake structure of a straddle vehicle comprising:
an air cleaner arranged below a tank member disposed above left and right main frames, said air cleaner including a main chamber, located between the left and right main frames and a pair of sub-chambers, each sub-chamber located on an outside in a vehicle width direction of the left and right main frames;
a filter element arranged in the sub-chamber; and
a lid for covering the filter element from the outside in the vehicle width direction and being fastened to each sub-chamber,
wherein a rear section of each sub-chamber and a rear section of the filter element are located in a space formed between each outside wall surface of the left and right main frames and an inside wall surface of the tank member,
wherein a front section of each sub-chamber and a front section of the filter element are located in a forward direction of the space and project forwardly of the tank member in a side view of a vehicle body, and the front section of each sub-chamber is provided with a fastener for fastening the element to the lid,
wherein the lid has a rearwardly projecting claw portion, said sub-chamber being provided, at the rear section thereof located in the space, with an aperture portion into which the claw portion is inserted and engaged from a front side.

12. The air intake structure of the straddle vehicle according to claim 11, and further comprising an element fastening means for fastening the element to the sub-chamber, wherein the element fastening means is located forwardly of the tank member.

13. The air intake structure of the straddle vehicle according to claim 11, and further comprising a resonator being located downstream of the filter element in the sub-chamber, wherein the resonator is mounted in a filter element opening to which the filter element is fitted, in the side view of the vehicle body.

14. An air intake structure of a straddle vehicle comprising:
an air cleaner arranged below a tank member disposed above left and right main frames, said air cleaner including a main chamber, located between the left and right main frames and a pair of sub-chambers, each sub-chamber located on an outside in a vehicle width direction of the left and right main frames;
a filter element arranged in the sub-chamber; and
a lid for covering the filter element from the outside in the vehicle width direction and being fastened to each sub-chamber,
wherein a rear section of each sub-chamber and a rear section of the filter element are located in a space formed between each outside wall surface of the left and right main frames and an inside wall surface of the tank member,
wherein a front section of each sub-chamber and a front section of the filter element are located in a forward direction of the space and project forwardly of the tank member in a side view of a vehicle body, and the front section of each sub-chamber is provided with a fastener for fastening the element to the lid,
wherein the space provided between each outside wall surface of the left and right main frames and the inside wall surface of the tank member is formed of a substantially V-shaped space which is widened in the forward direction, the element lid is formed to be widened in the vehicle width direction while extending forwardly along the inside wall surface of the tank member, and an air intake duct is removably mounted in a forward position of the tank member.

15. An air intake structure of a straddle vehicle comprising:
an air cleaner arranged below a tank member disposed above left and right main frames, said air cleaner including a main chamber, located between the left and right main frames and a pair of sub-chambers, each sub-chamber located on an outside in a vehicle width direction of the left and right main frames;
a filter element arranged in the sub-chamber; and
a lid for covering the filter element from the outside in the vehicle width direction and being fastened to each sub-chamber,
wherein a rear section of the sub-chamber and a rear section of the filter element are located in a space formed between each outside wall surface of the left and right main frames and an inside wall surface of the tank member,
wherein a front section of the sub-chamber and a front section of the filter element are located forwardly of the space and project forwardly of the tank member in a side view of a vehicle body, and the front section of the sub-chamber is provided with a fastener for fastening the element to the lid,
wherein the air cleaner is formed with the main chamber and an air cleaner case having left and right straddling sections each of which extends left and right from the main chamber and straddles the left and right main frames from above, wherein the left and right straddling sections have openings which open outwardly in the vehicle width direction, and wherein the filter element is arranged in each of the openings and the lid is fastened in such a way so as to close each of the openings to form the pair of sub-chambers.

* * * * *